United States Patent [19]

Ota

[11] Patent Number: 4,647,983
[45] Date of Patent: Mar. 3, 1987

[54] METHOD AND APPARATUS FOR RECORDING AND/OR REPRODUCING COLOR VIDEO SIGNAL

[75] Inventor: Yoshihiko Ota, Yokohama, Japan

[73] Assignee: Victor Company of Japan Ltd., Yokohama, Japan

[21] Appl. No.: 655,377

[22] Filed: Sep. 28, 1984

[30] Foreign Application Priority Data

Sep. 30, 1983 [JP] Japan ............................... 58-182417
Sep. 30, 1983 [JP] Japan ............................... 58-182418

[51] Int. Cl.$^4$ ........................................... H04N 9/493
[52] U.S. Cl. ..................................... 358/310; 358/330
[58] Field of Search ............... 358/310, 328, 330, 335; 360/33.1

[56] References Cited

U.S. PATENT DOCUMENTS 4,491,876  1/1985  Aoike et al. .......................... 358/330
4,554,596 11/1985  Shibata et al. ....................... 358/330

Primary Examiner—Robert L. Richardson
Attorney, Agent, or Firm—Michael N. Meller

[57] ABSTRACT

A method of recording and/or reproducing color video signal comprises the steps of forming from a color video signal a frequency division multiplexed signal of an FM luminance signal and a frequency converted carrier chrominance signal, recording the frequency division multiplexed signal on a first track on a magnetic tape by one of two heads constituting a pair, forming a high-frequency signal at least including an added signal made up of a high-frequency component of the color video signal and a high-frequency bias signal, recording the high-frequency signal on a second track by the other of the two heads simultaneously as the recording of the first track, demodulating at least a reproduced luminance signal from a signal reproduced from the first track, obtaining at least a high-frequency component of a luminance signal from a signal reproduced from the second track, and mixing the reproduced luminance signal, the high-frequency component of the luminance signal, and a reproduced carrier chrominance signal reproduced from the reproduced frequency division multiplexed signal, or a reproduced carrier chrominance signal separated from the reproduced high-frequency signal. A recording and reproducing apparatus performs recording and reproduction according to the above method.

22 Claims, 22 Drawing Figures

METHOD AND APPARATUS FOR RECORDING AND/OR REPRODUCING COLOR VIDEO SIGNAL

BACKGROUND OF THE INVENTION

The present invention generally relates to methods and apparatuses for recording and/or reproducing color video signals, and more particularly to a method and apparatus for recording an information signal so that the signal can be reproduced with a band which is wider than the transmission band of the information signal and for reproducing the signal with the band which is wider than the transmission band of the information signal, when recording and reproducing a color video signal by performing the processes of separating a luminance signal and a carrier chrominance signal from the color video signal, frequency-modulating the separated luminance signal, frequency-converting the separated carrier chrominance signal into a band which is lower than the band of the frequency modulated luminance signal, and frequency-division-multiplexing the frequency modulated luminance signal and the frequency converted carrier chrominance signal.

As is well known, an existing helical scan type video signal recording and reproducing apparatus (hereinafter simply referred to as a VTR) for home use separates a luminance signal and a carrier chrominance signal from a standard system (such as the NTSC system, PAL system, and SECAM system, for example) color video signal during a recording mode. The separated luminance signal is frequency-modulated, and the separated carrier chrominance signal is frequency-converted into a band which is lower than the band of the frequency modulated luminance signal. The frequency modulated luminance signal and the frequency converted carrier chrominance signal are frequency-division-multiplexed, and the frequency division multiplexed signal is recorded onto a magnetic tape by use of rotary heads. On the other hand, during a reproducing mode, the frequency division multiplexed signal is reproduced from the magnetic tape by use of rotary heads, and a reproduced frequency modulated luminance signal and a reproduced frequency converted carrier chrominance signal are frequency-selected from the reproduced frequency division multiplexed signal. The reproduced frequency modulated signal is frequency-demodulated so as to obtain a reproduced luminance signal, and the reproduced frequency converted carrier chrominance signal is frequency-converted back into the original band so as to obtain a reproduced carrier chrominance signal. The reproduced luminance signal and the reproduced carrier chrominance signal are mixed so as to obtain a reproduced color video signal which is in conformance with the standard system.

In the above VTR for home use employing the low band conversion method of recording and reproduction, the recording and reproducing band of the luminance signal is limited to approximately 3 MHz (resolution of approximately 250 lines). A relative linear speed between the rotary head and the magnetic tape is set in accordance with the transmission band of the luminance signal. As a result, the diameter of a rotary drum which is mounted with the rotary heads can be set to a small value, and the VTR can be downsized. Further, the tape utilization efficiency is high.

In the VTR having such settings, the transmission band of the signal may be increased to a small extent in the future, as the performances of the magnetic tape and the rotary heads improve and the circuit technology progresses. However, under the condition of the limited relative speed between the rotary head and the magnetic tape, a rapid progress (for example, increasing the transmission band to an extent that is required to transmit a signal without limiting the original band of the signal) cannot be expected. The color video signal has a band of approximately 4.2 MHz in the case of the NTSC system and approximately 5.5 MHz in the case of the PAL or SECAM system. Hence, it is one of the objects of the VTR for home use to transmit the signal with fidelity and without limiting the original band of the signal, even under the condition of the limited relative speed between the rotary head and the magnetic tape.

SUMMARY OF THE INVENTION

Accordingly, it is an object of the present invention to provide a novel and useful method and apparatus for recording and/or reproducing color video signal, in which the problems described heretofore are eliminated.

Another and more specific object of the present invention is to provide a method and apparatus for recording and/or reproducing color video signal, for simultaneously forming a track recorded with a frequency division multiplexed signal which is obtained according to the low band conversion method of recording, and a track recorded directly with a high-frequency component of a color video signal.

Still another object of the present invention is to provide a method of recording and/or reproducing color video signal, according to which a recording system records a frequency division multiplexed signal on a first track by use of a first head. The frequency division multiplexed signal is obtained by frequency-modulating a luminance signal which is separated from a color video signal, frequency-converting a carrier chrominance signal which is separated from the color video signal into a band which is lower than the band of the frequency modulated luminance signal, and then frequency-division-multiplexing the frequency modulated luminance signal and the frequency converted carrier chrominance signal. On the other hand, a high-frequency signal is recorded directly on a second track by use of a second head, simultaneously as the formation of the first track. The second track is formed at a position different from the position of the first track. The high-frequency signal at least includes an added signal which is obtained by adding a high-frequency bias signal to a high-frequency component of the color video signal. The first and second tracks are considered as a pair, and the color video signal is successively recorded on the tracks in terms of this pair. A reproducing system reproduces the signal which is recorded by the above recording system. A recording and/or reproducing apparatus according to the present invention carries out the recording and/or reproduction in accordance with the method described above.

According to the method and apparatus of the present invention, the following advantageous effects are obtained, as will be clear from the detailed description which is given later on in the specification:

(a) The track recorded directly with the high-frequency signal which includes all of the high-frequency components of the color video signal, is formed simultaneously as the track recorded with the frequency division multiplexed signal which is made up of the frequency modulated luminance signal and the frequency converted carrier chrominance signal. Hence, by reproducing the luminance signals from the two tracks and mixing the reproduced luminance signals, it is possible to widen the band of the reproduced color video signal compared to the existing VTR employing the low band conversion method of recording and reproduction. Thus, it is possible to reproduce the full band of the color video signal.

(b) In relation to the effects described under item (a) above, the resolution of the luminance signal is improved. In addition, the band of the carrier chrominance signal is not limited by the transmission thereof within the high-frequency signal. As a result, the original band of the signal is reserved. In the existing VTR, there is a color inconsistency and blur around the contours of images in the reproduced picture, however, such color inconsistency and blur are minimized according to the present invention.

(c) In a case where the reproducing apparatus employs a signal reproducing system which obtains a reproduced carrier chrominance signal by frequency-converting the frequency converted carrier chrominance signal back into the original band and uses the reproduced carrier chrominance signal as the carrier chrominance signal within the reproduced color video signal which is obtained at the final output, it is unnecessary to provide a time base corrector (the time base corrector is required for the PAL and NTSC system color video signals, and the time base corrector is originally not required for the SECAM system color video signal). Hence, it is possible to improve the resolution by use of a circuit having a simple circuit construction.

(d) In a case where the reproducing apparatus employs a signal reproducing system which uses the carrier chrominance signal within the high-frequency signal as the carrier chrominance signal within the reproduced color video signal which is obtained at the final output, it is unnecessary to provide a circuit for eliminating a phase shift in the phase shifted reproduced frequency converted carrier chrominance signal when the color video signal is of the PAL or NTSC system. As a result, it is possible to reproduced the carrier chrominance signal in a circuit having a simple circuit construction.

A further object of the present invention is to provide a method and apparatus for recording and/or reproducing color video signal, which take into account the compatibility between the existing helical scan type VTR. According to the recording method, a track recorded with a frequency division multiplexed signal which is obtained according to the low band conversion method of recording, and a track recorded directly with a high-frequency component of a color video signal, are formed simultaneously. According to the reproducing method, the signal which is recorded by the above recording method is reproduced. The recording and/or reproducing apparatus according to the present invention carries out the recording and/or reproduction in accordance with the recording and/or reproducing method described above.

According to the method and apparatus of the present invention, the following advantageous effects are obtained in addition to those described before:

(e) When a magnetic tape recorded by the recording apparatus according to the present invention is played on the existing VTR, the video signal can be reproduced from the track which is recorded with the frequency division multiplexed signal including the frequency converted carrier chrominance signal, with a reproducing band of the VTR, regardless of whether the VTR is provided with rotary heads for recording and reproducing an audio signal. Moreover, in a case where the VTR is provided with the rotary heads for recording and reproducing the audio signal, it is possible to reproduce an FM audio signal from the track which is recorded with the high-frequency signal, and as a result, is possible to obtain a high fidelity sound.

(f) A magnetic tape recorded by the existing VTR can be played compatibly on the reproducing apparatus according to the present invention, by only adding a small number of circuits.

Other objects and further features of the present invention will be apparent from the following detailed description when read in conjunction with the accompanying drawings.

DETAILED DESCRIPTION

Figure 1:
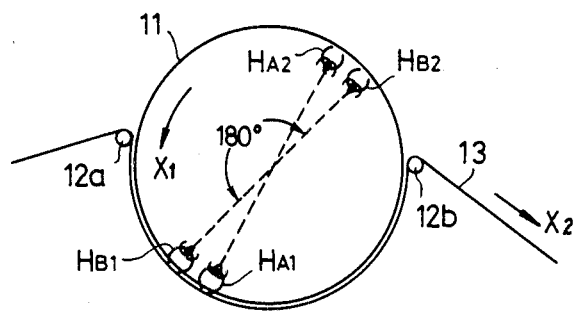
FIG. 1 is a diagram for explaining the positional relationship of rotary heads in the apparatus according to the present invention.

First, description will be given with respect to an example of the positional relationship of rotary heads in the apparatus according to the present invention, by referring to FIG. 1. In FIG. 1, rotary heads $H_{A1}$ and $H_{A2}$ are mounted on a rotary body 11 at mutually opposing positions in the diametral direction thereof, that is, with an angular separation of 180°. Rotary heads $H_{B1}$ and $H_{B2}$ are also mounted on the rotary body 11 with an angular separation of 180°. The rotary heads $H_{B1}$ and $H_{B2}$ are mounted at positions lagging the respective rotary heads $H_{A1}$ and $H_{A2}$ by a predetermined distance in a rotating direction $X_1$ of the rotary body 11. The rotary body 11 and the rotary heads $H_{A1}$, $H_{A2}$, $H_{B1}$, and $H_{B2}$ are rotated unitarily by a head motor (not shown) in the rotating direction $X_1$ (that is, counterclockwise), at a rotational speed of F/2 (rps), where F represents the field frequency (Hz) of a video signal which is to be recorded. A magnetic tape 13 is wrapped around the outer peripheral surface of the rotary body 11 over an angular range which is greater than 180°, under the guidance of guide poles 12a and 12b. The tape 13 is driven in a state pinched between a capstan (not shown) and pinch roller (not shown), and moves in a direction $X_2$. The tape 13 moves at a speed of one track pitch as the rotary body 11 undergoes ½ revolution.

Figure 2:
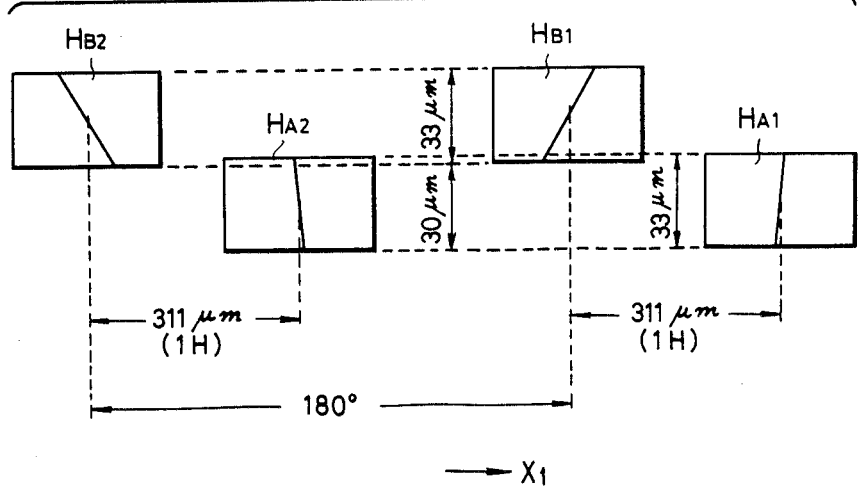
FIG. 2 is a diagram for explaining the relationship of the height positions of the rotary heads and arrangements of the rotary heads in the apparatus according to the present invention.

FIG. 2 shows embodiments of the relationship of the height positions of the rotary heads and arrangements of the rotary heads in the apparatus according to the present invention. In FIG. 2, those parts which are the same as those corresponding parts in FIG. 1 are designated by the same reference numerals, and their description will be omitted. The rotary heads $H_{A1}$, $H_{A2}$, $H_{B1}$, and $H_{B2}$ have the same track width of 33 μm, and the rotary heads $H_{B1}$ and $H_{B2}$ are mounted at height positions which are higher than the height positions of the rotary heads $H_{A1}$ and $H_{A2}$ by a distance of 30 μm. The lower surfaces of the rotary heads $H_{A1}$ and $H_{A2}$ are aligned to the same height position, and the lower surfaces of the rotary heads $H_{B1}$ and $H_{B2}$ are aligned to the same height position which is higher than that of the rotary heads $H_{A1}$ and $H_{A2}$ by the distance of 30 μm. For example, the rotary heads $H_{A1}$, $H_{A2}$, $H_{B1}$, and $H_{B2}$ have gaps having azimuth angles of +6°, −6°, +30°, and −30°, respectively. An interval between gaps of the rotary heads $H_{A1}$ and $H_{B1}$ is selected to a distance which is equal to the recording length (approximately 311 μm in the case of the PAL system color video signal) of one horizontal scanning period (1H), for example. An interval between the gaps of the rotary heads $H_{A2}$ and $H_{B2}$ is also selected to a distance which is equal to the recording length of one horizontal scanning period.

Hence, the rotary heads $H_{A1}$ and $H_{A2}$ are provided at positions leading the respective rotary heads $H_{B1}$ and $H_{B2}$ in the rotating direction $X_1$ of the rotary body 11, by an extremely short distance corresponding to the recording length of 1H. The azimuth angles of the gaps of the rotary heads $H_{A1}$ and $H_{B1}$ mutually differ by 24°, but the sloping directions of the gaps with respect to the track width direction are the same. Similarly, the azimuth angles of the gaps of the rotary heads $H_{A2}$ and $H_{B2}$ mutually differ by 24°, but the sloping directions of the gaps with respect to the track width direction are the same. The rotary heads $H_{A1}$ and $H_{A2}$ are provided for recording and reproducing a frequency modulated luminance signal and a frequency converted carrier chrominance signal. On the other hand, the rotary heads $H_{B1}$ and $H_{B2}$ are provided for recording and reproducing a high-frequency component of the color video signal.

Figure 3:
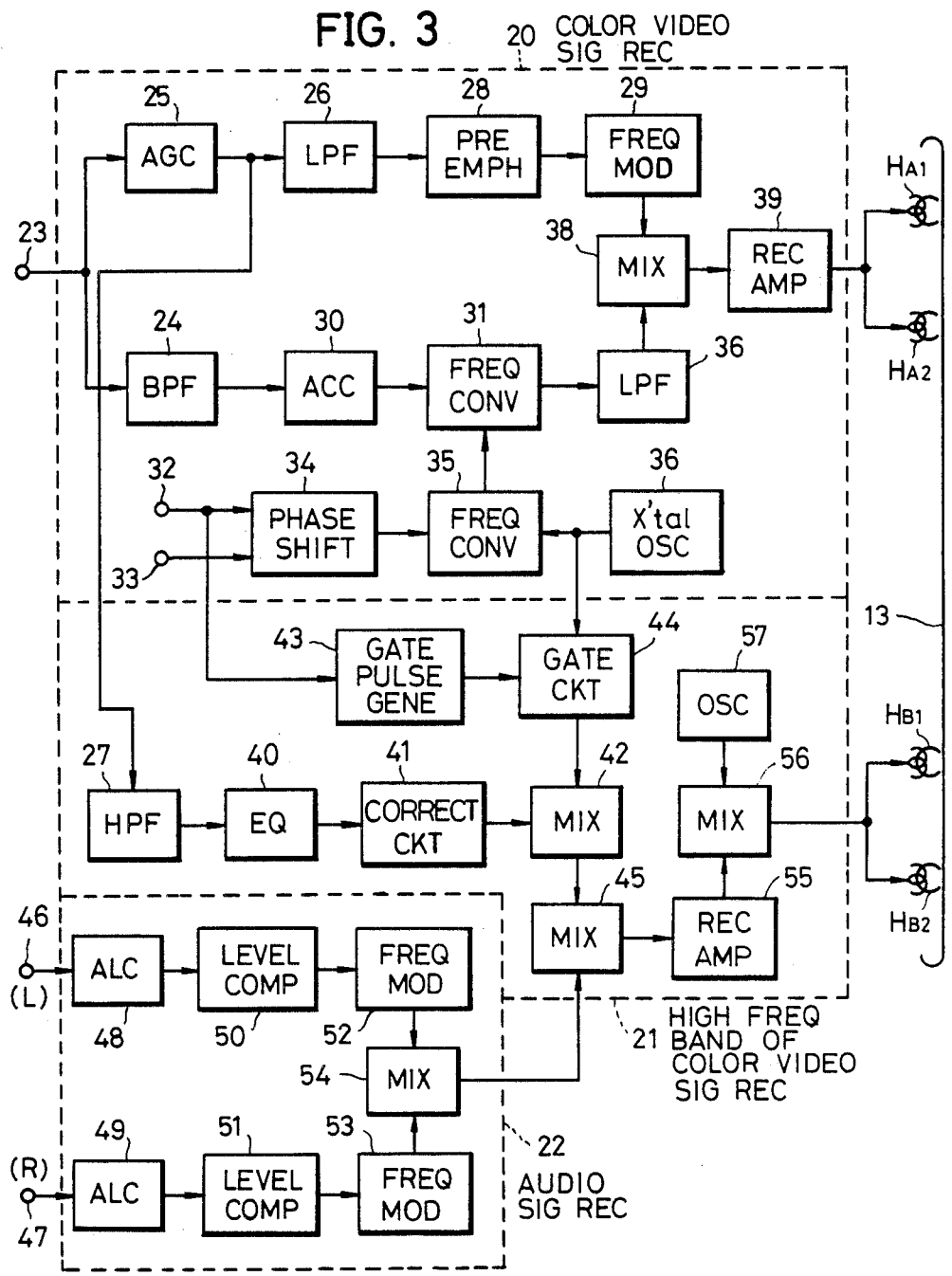
FIG. 3 is a systematic block diagram showing an embodiment of a recording system of the apparatus according to the present invention.

Next, description will be given with respect to an embodiment of a signal recording system of the apparatus according to the present invention, by referring to FIG. 3. The signal recording system shown in FIG. 3 generally comprises a color video signal recording circuit 20, a recording circuit 21 for recording a high-frequency component of the color video signal, and an audio signal recording circuit 22. The color video signal recording circuit 20 has the same construction as a color video signal recording circuit of the existing VTR. In other words, the color video signal recording circuit 20 receives an input standard system color video signal, and produces a frequency division multiplexed signal made up of a frequency modulated luminance signal and a frequency converted carrier chrominance signal. The audio signal recording circuit 22 is the same as an audio signal recording circuit of the existing VTR which records the audio signal by use of the rotary heads. That is, the audio signal recording circuit 22 converts an input audio signal into a frequency modulated audio signal. On the other hand, the recording circuit 21 is peculiar to the present invention. As will be described hereinafter, the recording circuit 21 receives the input color video signal and produces signals such as an added signal of a bias signal and the high-frequency component of the color video signal.

The input standard system color video signal which is to be recorded, is applied to an input terminal 23. For convenience' sake, it will be assumed that the input standard system color video signal is a PAL system color video signal. The PAL system color video signal from the input terminal 23, is supplied to a bandpass filter 24 having a passband in the range of 4 MHz to 5 MHz. Hence, a carrier chrominance signal is separated in the bandpass filter 24, and the separated carrier chrominance signal is supplied to a lowpass filter 26 and to a highpass filter 27, through an automatic gain control (AGC) circuit 25. The lowpass filter 26 has a cutoff frequency in the range of 3 MHz. Thus, a luminance signal which is separated in the lowpass filter 26, is supplied to a pre-emphasis circuit 28 wherein a high-frequency component of the separated luminance signal is emphasized so as to improve the signal-to-noise (S/N) ratio of the high-frequency component which is easily affected by noise. An output pre-emphasized luminance signal of the pre-emphasis circuit 28, is supplied to a frequency modulator 29.

For example, the frequency modulator 29 produces a frequency modulated wave (frequency modulated luminance signal) in which the frequency deviation of the carrier is equal to 1.0 MHz so that the output of the frequency modulator 29 is equal to 3.8 MHz responsive to a synchronizing tip level of the incoming luminance signal and 4.8 MHz responsive to a white peak level of the incoming luminance signal. Actually, a white/dark clipping circuit is provided in the input stage of the frequency modulator 29, and a highpass filter is provided in the output stage of the frequency modulator 29 so as to eliminate the unwanted frequency component.

An output carrier chrominance signal of the bandpass filter 24 is supplied to an automatic chroma control (ACC) circuit 30 wherein the color burst signal level is made constant. An output carrier chrominance signal of the ACC circuit 30 is supplied to a frequency converter 31. A horizontal synchronizing signal which is separated from the input color video signal in a synchronizing signal separating circuit (not shown), is applied to an input terminal 32. In addition, a rotation detection pulse signal (for example, a square wave having a frequency of 25 Hz) which is synchronized to the rotation of the rotary heads $H_{A1}$ and $H_{A2}$ (and $H_{B1}$ and $H_{B2}$), is applied to an input terminal 33. A phase shifting circuit 34 shifts the phase of the chrominance subcarrier of the frequency converted carrier chrominance signal in order to eliminate the crosstalk of the frequency converted carrier chrominance signal from the adjacent track. The phase shifting circuit 34 generates therein four kinds of pulse signals having a repetition frequency which is 40 times the frequency $f_H$ of the horizontal synchronizing signal from the input terminal 33, for example, and having phases which differ from each other by 90°. The phase shifting circuit 34 produces a pulse signal having a phase which shifts by 90° for every 1H in a predetermined direction during half a period in which there exists a rotation detection pulse signal from the input terminal 33, and produces a pulse signal having a constant phase by stopping the phase shift during the subsequent half period. Details of recording and reproducing systems employing this phase shifting circuit, is disclosed in a Japanese Patent Publication No. 32273/1980, for example.

An output signal of the phase shifting circuit 34, which is alternately subjected to the process in which the phase is shifted by 90° and to the process in which the phase is not shifted, for every half period of the rotation detection pulse signal, has the frequency of $40f_H$ and is supplied to a frequency converter 35. The frequency converter 35 is also supplied with an output signal of a crystal oscillator 36 having a frequency of $f_S+(\frac{1}{8})f_H$ which is a sum of the chrominance subcarrier frequency $f_S$ (=4.433619 MHz) of the PAL system carrier chrominance signal and a frequency of $(\frac{1}{8})f_H$. Hence, the frequency converter 35 performs a frequency conversion between the output signals of the phase shifting circuit 34 and the crystal oscillator 36, and produces a signal having a frequency of $f_S+40f_H+(\frac{1}{8})f_H$. The output signal of the frequency converter 35 is supplied to the frequency converter 31. As a result, the frequency converter 31 performs a frequency conversion between the output carrier chrominance signal of the ACC circuit 30 having the chrominance subcarrier frequency $f_S$, and the output signal of the frequency converter 35 having a single frequency of $f_S+40f_H+(\frac{1}{8})f_H$ and having a phase which shifts by 90° for every other field. An output signal of the frequency converter 31 is supplied to a lowpass filter 37. The lowpass filter 37 has a cutoff frequency in the range of 1.2 MHz, and produces a frequency converted carrier chrominance signal having a chrominance subcarrier frequency of 626.953 kHz $(=40f_H+(\frac{1}{8})f_H)$. The output frequency converted carrier chrominance signal of the lowpass filter 37 is supplied to a mixing circuit 38 and is frequency-division-multiplexed with the output frequency modulated luminance signal of the frequency modulator 29.

An output frequency division multiplexed signal of the mixing circuit 38 is amplified in a recording amplifier 39, and is supplied to the rotary heads $H_{A1}$ and $H_{A2}$ through a rotary transformer (not shown). The rotary heads $H_{A1}$ and $H_{A2}$ alternately record the frequency division multiplexed signal on the tape 13. When it is assumed that the chrominance subcarrier of the frequency converted carrier chrominance signal within the frequency division multiplexed signal is not phase shifted in a period of one field in which the recording is performed by the rotary head $H_{A1}$, the chrominance subcarrier of the frequency converted carrier chrominance signal is phase shifted by 90° for every 1H in a period of one field in which the recording is performed by the rotary head $H_{A2}$. As is well known, when the frequency division multiplexed signal is transmitted through the tape 13 which is a non-linear system having odd harmonic distortions, a frequency component having a frequency of $f_o \pm 2f_{DC}$ is generated in the frequency modulated luminance signal as an interfering wave which cannot be neglected, where $f_o$ represents the frequency of the frequency modulated carrier and $f_{DC}$ represents the frequency of the frequency converted carrier chrominance signal. When this frequency component is frequency-demodulated, a beat of the component $2f_{DC}$ is introduced in the luminance signal. Accordingly, the chrominance subcarrier frequency $f_C$ of the frequency converted carrier chrominance signal is selected to a frequency which satisfies the following equation, so that the component of $2f_{DC}$ is offset by $\frac{1}{4}$ lines with respect to the luminance signal and is visually inconspicuous.

$$2f_C=[(2n-1)/4]f_H$$

In the present embodiment, n is set to "161" so that the frequency spectrum of the frequency converted carrier chrominance signal is the same as the frequency spectrum of the frequency converted carrier chrominance signal which is recorded and reproduced in the existing VTR, as will be described later on in the specification.

Figure 4:
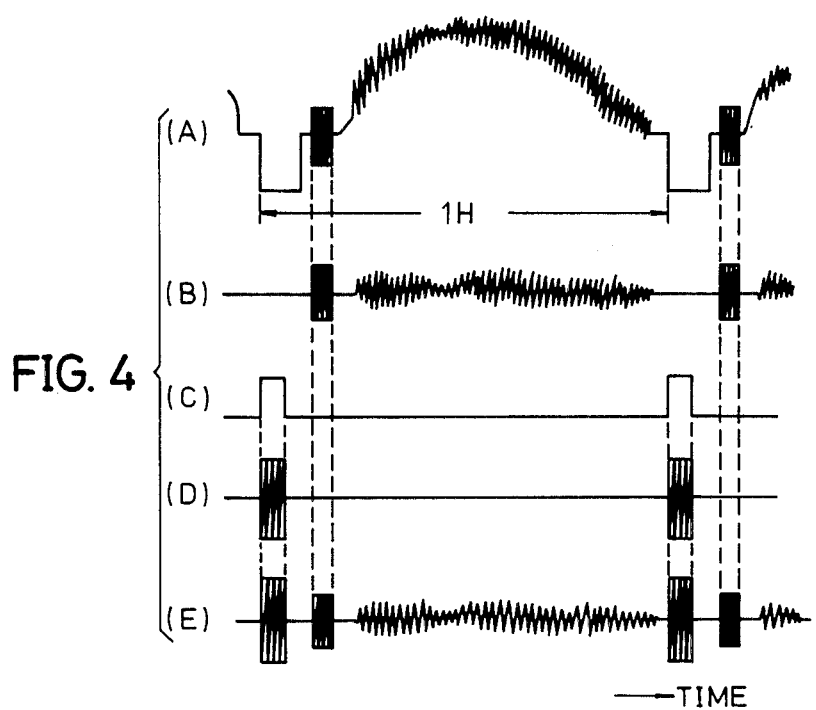
FIGS. 4(A) through 4(E) show signal waveforms at each part of the block system shown in FIG. 3.

On the other hand, the highpass filter 27 has a cutoff frequency in the range of 1.8 MHz, and produces a high-frequency component of over approximately 1.8 MHz within the PAL system color video signal. When a PAL system color video signal having the waveform shown in FIG. 4(A) is applied to the input terminal 23, a high-frequency component having the waveform shown in FIG. 4(B) is obtained from the highpass filter 27. This high-frequency component is a band share multiplexed signal of the carrier chrominance signal and a high-frequency component of the luminance signal of over approximately 1.8 MHz. The output signal of the highpass filter 27 is supplied to a delaying and correcting circuit 41 through an equalizer circuit 40. The delaying and correcting circuit 41 delays the band share multiplexed signal so as to match the timing of an output signal of the delaying and correcting circuit 41 and the output frequency division multiplexed signal of the mixing circuit 38. The output signal of the delaying and correcting circuit 41 is supplied to a mixing circuit 42.

On the other hand, the horizontal synchronizing signal applied to the input terminal 32, is supplied to a gate pulse generating circuit 43 wherein the horizontal synchronizing signal is converted into a gate pulse signal which assumes a high level within the horizontal synchronizing pulse as shown in FIG. 4(C). The output gate pulse signal of the gate pulse generating circuit 43 is supplied to a gate circuit 44. The gate circuit 44 is designed to pass the output signal of the crystal oscillator 36 having the constant level and the frequency of $f_S+(\frac{1}{8})f_H$, only during a high-level period of the gate pulse signal. Accordingly, a signal having a burst waveform shown in FIG. 4(D) is produced from the gate circuit 44, and is supplied to the mixing circuit 42 as a pilot signal. As will be described later on in the specification, this pilot signal is used as a time reference when correcting a time difference between the signals which are reproduced by the rotary heads $H_{A1}$ and $H_{B1}$ (or $H_{A2}$ and $H_{B2}$) and as a level reference when correcting a level change caused by differences in the sensitivities of the tape and the rotary heads or tracking error. Thus, a signal shown in FIG. 4(E) which is a time division multiplexed signal of the high-frequency component shown in FIG. 4(B) and the pilot signal shown in FIG. 4(D), is produced from the mixing circuit 42 and is supplied to a mixing circuit 45 provided in a subsequent stage.

Next, description will be given with respect to the audio signal recording circuit 22 which supplies an FM audio signal to the mixing circuit 45. A right-channel (R-channel) audio signal and a left-channel (L-channel) audio signal are applied to respective input terminals 47 and 46, and are then supplied to respective automatic level control (ALC) circuits 49 and 48 wherein the respective gains are automatically controlled. In order to reduce the noise which occurs during the recording and reproducing processes, output signals of the ALC circuits 48 and 49 are supplied to respective level compression circuits 50 and 51 wherein the levels of the signals are compressed. Output signals of the level compression circuits 50 and 51 are supplied modulator 52 generates a first FM audio signal by frequency-modulating a carrier of 1.4 MHz, for example, by the L-channel audio signal. On the other hand, the frequency modulator 53 generates a second FM audio signal by frequency-modulating a carrier of 1.8 MHz, for example, by the R-channel audio signal. The first and second FM audio signals are supplied to a mixing circuit 54 wherein the FM audio signals are frequency-division-multiplexed. An output frequency division multiplexed signal of the mixing circuit 54 is then supplied to the mixing circuit 45 and is frequency-division-multiplexed with the output signal of the mixing circuit 42 shown in FIG. 4(E).

An output frequency division multiplexed signal of the mixing circuit 45 is passed through a recording amplifier 55, and is supplied to a mixing circuit 56. The mixing circuit 56 adds a bias signal to the output frequency division multiplexed signal of the recording amplifier 55.

Description will now be given with respect to the selection of the bias signal frequency. When the bias signal is added to the high-frequency component of the color video signal and the added signal is recorded onto and reproduced from the tape, a cross modulation occurs between the bias signal and the carrier chrominance signal within the high-frequency component, and noise is generated when cross modulation spurious signals enter within the signal band. It is known that the cross modulation spurious signals obtained when two signals are added and recorded onto the tape, are odd harmonic distortions. Among such odd harmonic distortions, the spurious signals which enter within the signal band mainly have frequencies of $f_B - 2f_S$, $2f_B - 3f_S$, and $f_B - 4f_S$, where $f_B$ represents the bias signal frequency and $f_S$ represents the chrominance subcarrier frequency of the carrier chrominance signal as described before.

Accordingly, measures must be taken so that the frequencies of the spurious signals are outside the signal band. In the present embodiment, the bias signal frequency $f_B$ is selected so that the frequency of $f_B - 4f_S$ is equal to zero. Thus, the bias signal frequency $f_B$ is selected to a frequency which is equal to $4f_S$, that is, 17.7 MHz (approximately 18 MHz). As a result, the mixing circuit 56 produces a signal in which the high-frequency bias signal having the frequency of approximately 18 MHz is added to the frequency division multiplexed signal which is made up of the high-frequency component of the color video signal, the pilot signal, and the first and second FM audio signals. The output signal of the mixing circuit 56 is passed through a rotary transformer (not shown), and is supplied to the rotary heads $H_{B1}$ and $H_{B2}$ which alternately record the signal on the tape 13. Therefore, the high-frequency component is recorded directly on the tape 13, without being frequency-modulated.

Figure 5A:
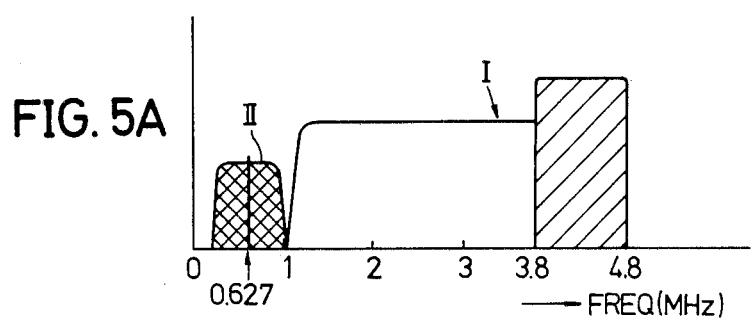
FIGS. 5A and 5B show embodiments of frequency spectrums of signals which are independently recorded and reproduced on and from two tracks on a magnetic tape by the apparatus according to the present invention.

Therefore, as shown in FIG. 5A, the frequency division multiplexed signal made up of the frequency modulated luminance signal having a frequency spectrum. I and the frequency converted carrier chrominance signal having a frequency spectrum II, is supplied to the rotary heads $H_{A1}$ and $H_{A2}$. On the other hand, the high-frequency component (that is, a band share multiplexed signal made up of a high-frequency component of the luminance signal of over approximately 1.8 MHz and having a frequency spectrum $III_Y$, and a carrier chrominance signal having a frequency spectrum $III_C$) of the color video signal having a frequency spectrum III, the first and second FM audio signals respectively having frequency spectrums IV and V, and the high-frequency bias signal having a frequency spectrum VI, are supplied to the rotary heads $H_{B1}$ and $H_{B2}$. The pilot signal has a constant frequency within the frequency spectrum $III_C$, and is time-division-multiplexed with the high-frequency component as described before.

Figure 5B:
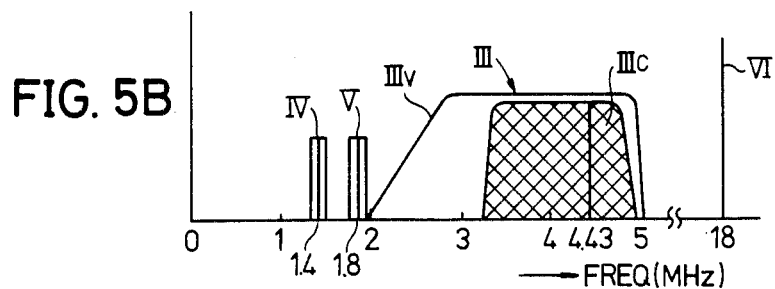
Figure 6A:
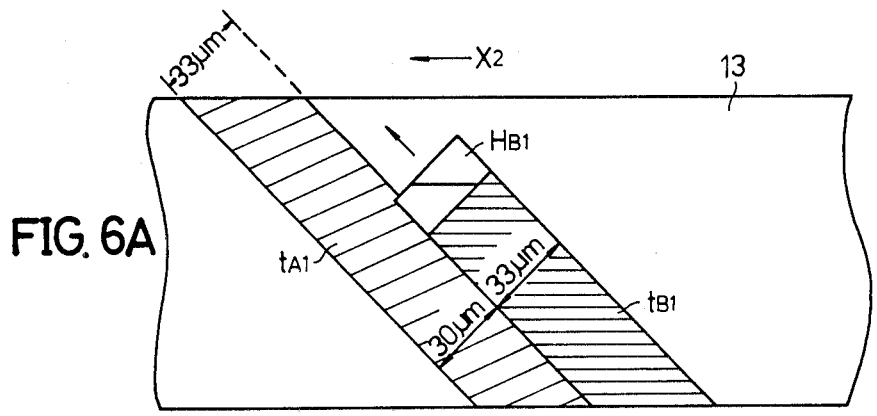
FIGS. 6A, 6B, and 6C show track patterns on the magnetic tape for explaining processes of forming the tracks on the magnetic tape.

Next, description will be given with respect to the formation of tracks by the rotary heads $H_{A1}$, $H_{A2}$, $H_{B1}$, and $H_{B2}$ which are supplied with the signals described above. First, it will be assumed that the frequency division multiplexed signal having the frequency spectrum shown in FIG. 5A, is recorded on a track $t_{A1}$ having a track width of 33 μm as shown in FIG. 6A, by the rotary head $H_{A1}$. The signals having the frequency spectrums shown in FIG. 5B, are recorded on a track $t_{B1}$ having a track width of 33 μm as shown in FIG. 6A, by the rotary head $H_{B1}$. As described before in conjunction with FIG. 2, the rotary head $H_{B1}$ is mounted at a position lagging the rotary head $H_{A1}$ by the recording length of 1H (approximately 311 μm in this case) in the rotating direction of the rotary body 11, and assumes a height position which is higher than the height position of the rotary head $H_{A1}$ by 30 μm. As shown in FIG. 6A, the rotary head $H_{B1}$ scans over a width of 3 μm of the recorded track $t_{A1}$ having the track width of 33 μm. In other words, there is an overlap of 3 μm between the tracks $t_{A1}$ and $t_{B1}$. The recorded signal in this overlapping part of the track $t_{A1}$, is substantially erased as the rotary head $H_{B1}$ scans over the overlapping part of the track $t_{A1}$, and the overlapping part of the track $t_{A1}$ is recorded with the signals supplied to the rotary head $H_{B1}$. As a result, the overlapping part of the track $t_{A1}$, having the width of 3 μm, is erased by the recording performed by the rotary head $H_{B1}$, and a track $t_{a1}$ having a track width of 30 μm remains. At the same time, the track $t_{B1}$ having the track width of 33 μm is formed.

Figure 6B:
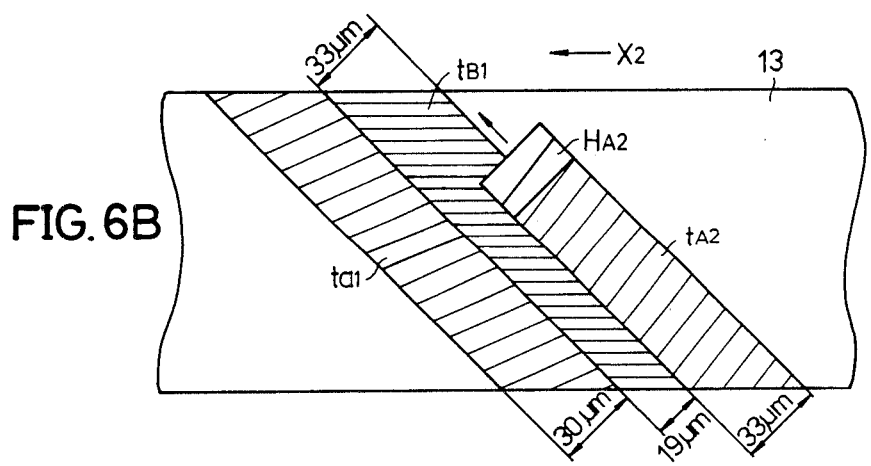

Next, when the rotary head $H_{A1}$ completes the recording of one field of the frequency division multiplexed signal, the rotary head $H_{A2}$ starts to record a subsequent one field of the frequency division multiplexed signal. It will be assumed that the tape 13 moves at a speed of 49 μm which is equal to one track pitch of the existing VTR, for every ½ revolution of the rotary body 11. In this case, the scanning locus of the rotary head $H_{A2}$ is located on the downstream side of the tape 13 and is separated by a distance of 49 μm from the scanning locus of the rotary head $H_{A1}$ which scans immediately prior to the rotary head $H_{A2}$. Hence, as shown in FIG. 6B, the rotary head $H_{A2}$ scans over a width of $(30+33)-49=14$ μm of the recorded track $t_{B1}$. The recorded signals in this overlapping part of the track $t_{B1}$, is substantially erased as the rotary head $H_{A2}$ scans over the overlapping part of the track $t_{B1}$ while forming a track $t_{A2}$, and the overlapping part of the track $t_{B1}$ is recorded with the signal supplied to the rotary head $H_{A2}$. As a result, the overlapping part of the track $t_{B1}$, having the width of 14 μm, is erased by the recording performed by the rotary head $H_{A2}$, and a track $t_{b1}$ having a track width of 19 μm remains. At the same time, the track $t_{A2}$ having the track width of 33 μm is formed.

Figure 6C:
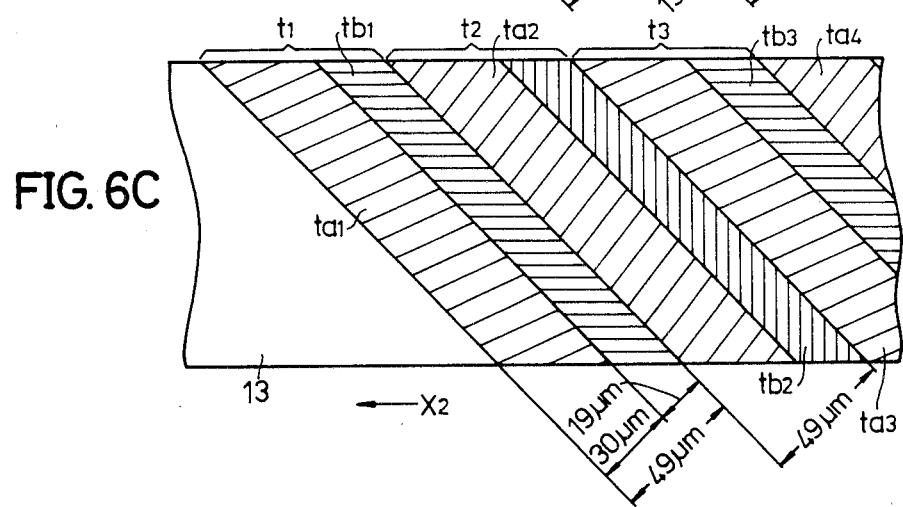

Similarly thereafter, the track pattern shown in FIG. 6C is formed by the successive scans of the rotary heads. In FIG. 6C, the PAL system color video signal is recorded in a sequence of tracks $t_1$, $t_2$, $t_3$, ... for every field. The track $t_1$, $t_2$, or $t_3$ which is recorded with the same field of the signal, is made up of the track $t_{a1}$, $t_{a2}$, or $t_{a3}$ recorded with the frequency division multiplexed signal shown in FIG. 5A and having a track width of 30 μm, and the track $t_{b1}$, $t_{b2}$, or $t_{b3}$ recorded directly with the high-frequency component of the color video signal and the two channels of FM audio signals shown in FIG. 5B and having a track width of 19 μm. In other words, the PAL system color video signal is successively recorded on tracks in terms of pairs, where the pair is constituted by the track ($t_{a1}$, $t_{a2}$, $t_{a3}$) which is recorded with the frequency division multiplexed signal made up of the frequency modulated luminance signal and the frequency converted carrier chrominance signal, and the track which is recorded with the high-frequency signal at least including the high-frequency component of the color video signal.

Figure 7:
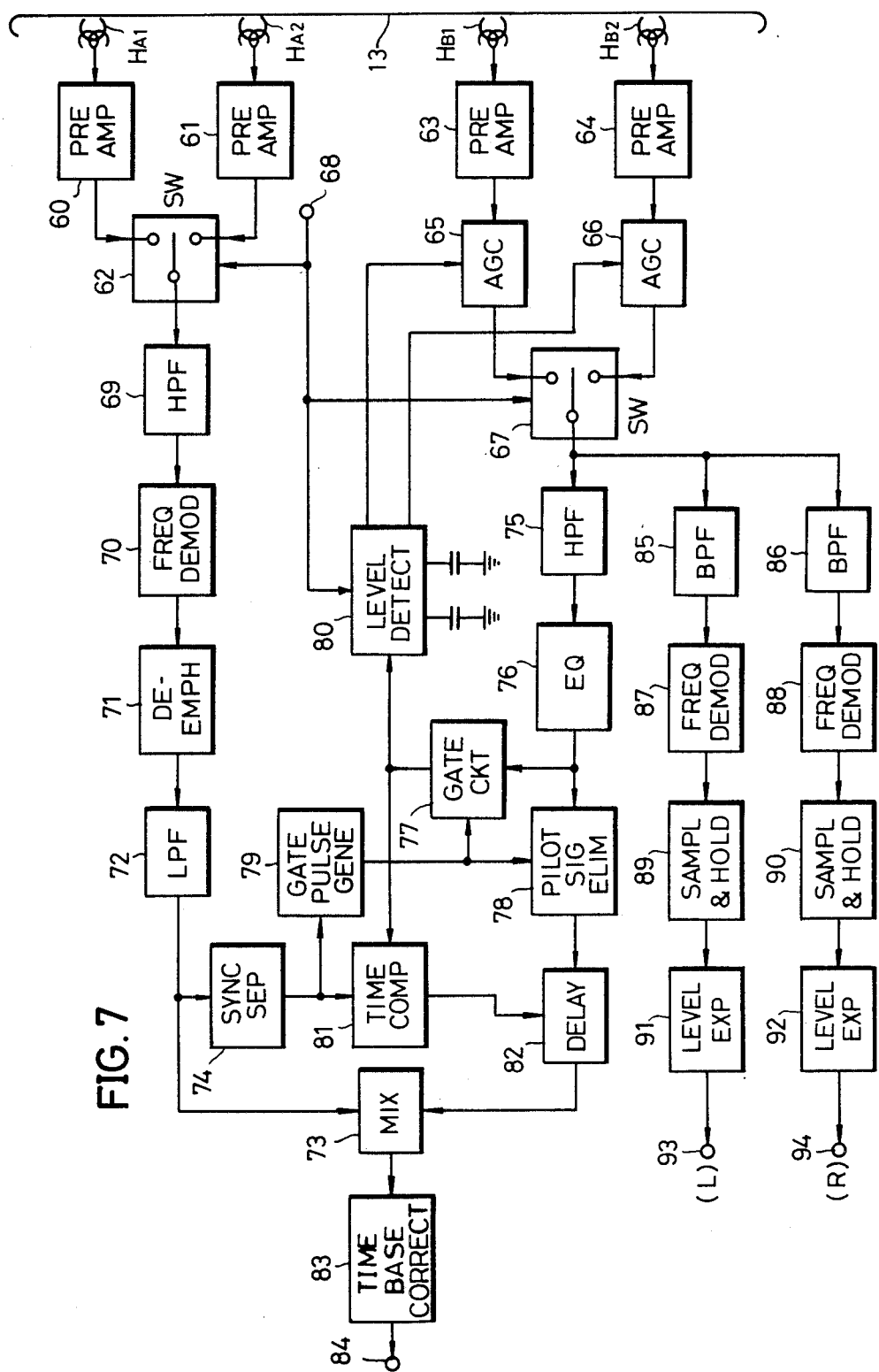
FIG. 7 is a systematic block diagram showing a first embodiment of a reproducing system of the apparatus according to the present invention.

Next, description will be given with respect to a first embodiment of a signal reproducing system of the apparatus according to the present invention, by referring to FIG. 7. This first embodiment is characterized in that the luminance signal which is separated from the signals reproduced from the tracks which are formed by the rotary heads $H_{A1}$ and $H_{A2}$, and the high-frequency component which is separated from the signals reproduced from the tracks which are formed by the rotary heads $H_{B1}$ and $H_{B2}$, are multiplexed and supplied to a time base corrector. Among the signals reproduced by the rotary heads $H_{A1}$, $H_{A2}$, $H_{B1}$, and $H_{B2}$ which scan over the tape 13 having the track pattern shown in FIG. 6C, the signals reproduced by the rotary heads $H_{A1}$ and $H_{A2}$ are passed through respective pre-amplifiers 60 and 61 shown in FIG. 7 and are supplied to a switching circuit 62. On the other hand, the signals reproduced by the rotary heads $H_{B1}$ and $H_{B2}$ are passed through respective pre-amplifiers 63 and 64 and respective automatic gain control (AGC) circuits 65 and 66 and are supplied to a switching circuit 67. A rotation detection pulse signal synchronized with the rotation of the rotary heads $H_{A1}$, $H_{A2}$, $H_{B1}$, and $H_{B2}$, is obtained through an input terminal 68 and is applied to the switching circuits 62 and 67 as a switching signal. Thus, the switching circuits 62 selectively passes the signal reproduced by the rotary head $H_{A1}$ or $H_{A2}$ which is scanning over the tape 13, and the switching circuit 67 selectively passes the signal reproduced by the rotary head $H_{B1}$ or $H_{B2}$ which is scanning over the tape 13.

Figure 8A:
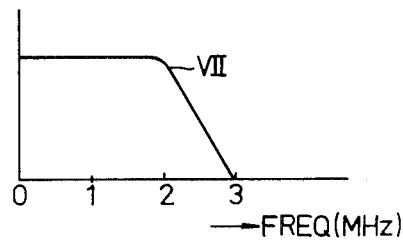
FIGS. 8A, 8B, and 8C show signal waveforms at each part of the block system shown in FIG. 7.

The reproduced signal obtained from the switching circuit 62 has the frequency spectrum shown in FIG. 5A, and this reproduced signal is supplied to a highpass filter 69 having a cutoff frequency of approximately 1.2 MHz. The highpass filter 69 separates a reproduced frequency modulated luminance signal from the reproduced signal, and supplies the reproduced frequency modulated luminance signal to a frequency demodulator 70 wherein the reproduced frequency modulated luminance signal is frequency-demodulated into a reproduced luminance signal. The reproduced luminance signal is supplied to a de-emphasis circuit 71 wherein a de-emphasis complementary to the pre-emphasis performed in the pre-emphasis circuit 28 is performed so as to attenuate the high-frequency component of the reproduced luminance signal. An output signal of the de-emphasis circuit 71 is passed through a lowpass filter 72 having a cutoff frequency in the range of 3 MHz, and is formed into reproduced luminance signal having a frequency spectrum VII shown in FIG. 8A. The output reproduced luminance signal of the lowpass filter 72 is supplied to a mixing circuit 73 and to a synchronizing signal separating circuit 74.

On the other hand, the reproduced signal obtained from the switching circuit 67, is the signal reproduced from the tracks $t_{b1}$, $t_{b2}$, $t_{b3}$, ... by the rotary head $H_{B1}$ or $H_{B2}$, and has a frequency spectrum excluding the frequency spectrum VI of the bias signal in FIG. 5B. This reproduced signal from the switching circuit 67, is supplied to a highpass filter 75, and to bandpass filters 85 and 86 which will be described later on in the specification. The highpass filter 75 has a cutoff frequency of approximately 1.8 MHz, and separates the high-frequency component (the waveform of this high-frequency component is the same as the waveform shown in FIG. 4(E)) of the color video signal having the frequency spectrum III in FIG. 5B. The separated high-frequency component from the highpass filter 75 is passed through an equalizer circuit 76, and is supplied to a gate circuit 77 and to a pilot signal eliminating circuit 78.

A gate pulse generating circuit 79 generates a gate pulse signal based on the horizontal synchronizing signal which is separated in the synchronizing signal separating circuit 74. The gate pulse signal from the gate pulse generating circuit 79, is supplied to the gate circuit 77 and to the pilot signal eliminating circuit 78. The gate circuit 77 gates the pilot signal (shown in FIG. 4(D)) which is time-division-multiplexed with the high-frequency component. The pilot signal eliminating circuit 78 blocks the pilot signal, and gates only the high-frequency component shown in FIG. 4(B). The output reproduced pilot signal of the gate circuit 77 is supplied to a level detecting circuit 80. An output signal of the level detecting circuit 80 is supplied to the AGC circuits 65 and 66 so as to variably control the gains of the AGC circuits 65 and 66, so that the level of the reproduced pilot signal becomes constant. Accordingly, it is possible to compensate a level change caused by differences between sensitivities of the tape and the rotary heads and a level change caused by the tracking error of the reproducing rotary head. At the same time, the output reproduced pilot signal of the gate circuit 77 is supplied to a time comparing circuit 81 and is subjected to a time comparison with the reproduced horizontal synchronizing signal from the synchronizing signal separating circuit 74. An output signal of the time comparing circuit 81 is supplied to a delay circuit 82 so as to variable control the delay time of the delay circuit 82, so that a time difference between the reproduced horizontal synchronizing signal and the output signal of the pilot signal eliminating circuit 78 becomes equal to a predetermined value.

As described before, the azimuth angles of the gaps of the rotary heads $H_{A1}$ and $H_{B1}$ (or $H_{A2}$ and $H_{B2}$) which are separated by the recording length of 1H and simultaneously scan over the tape 13, differ by an angle of 24°. Accordingly, when the rotary head $H_{A1}(H_{B1})$ scans over a track part which is recorded by a rotary head having a gap of an azimuth angle which is different from that of the rotary head $H_{A1}$ ($H_{B1}$), the crosstalk from the track part does not introduce problems due to the azimuth loss effect. However, when a tracking error takes place, a time difference is introduced between the signals reproduced by the rotary heads $H_{A1}$ and $H_{B1}$, because the azimuth angle of the gap of the rotary head $H_{B1}$ ($H_{B2}$) is considerably large compared to the azimuth angle of the gap of the rotary head $H_{A1}$ ($H_{A2}$) Thus, when no measure is taken to correct this time difference, the color inconsistency and blur occur around the contours of the images in the reproduced picture due to this time difference, and the reproduced picture becomes unsatisfactory for practical use. Therefore, it is essential to correct the time difference between the reproduced video signals which are obtained from the rotary heads $H_{A1}$ ($H_{A2}$) and $H_{B1}$ ($H_{B2}$), and the delay circuit 82 is provided to correct the above time difference.

For example, the delay circuit 82 is constituted by charge coupled devices (CCDs). The delay circuit 82 receives the reproduced high-frequency component obtained from the pilot signal eliminating circuit 78, and delays the high-frequency component by a delay time which is in accordance with a clock pulse signal from the time comparing circuit 81. This clock pulse signal from the time comparing circuit 81 indicates the time difference described before. As a result, a reproduced high-frequency component shown in FIG. 8B in which the high-frequency component of over approximately 1.8 MHz of the luminance signal and having a frequency spectrum VIII and a carrier chrominance signal having a frequency spectrum IX are band-share-multiplexed, is obtained from the delay circuit 82. The timing of this output reproduced high-frequency component of the delay circuit 82, is matched with the timing of the reproduced horizontal synchronizing signal (reproduced luminance signal) within the frequency division multiplexed signal which is reproduced by the rotary head $H_{A1}$ or $H_{A2}$. The output reproduced high-frequency component of the delay circuit 82, is supplied to the mixing circuit 73.

Figure 8B:
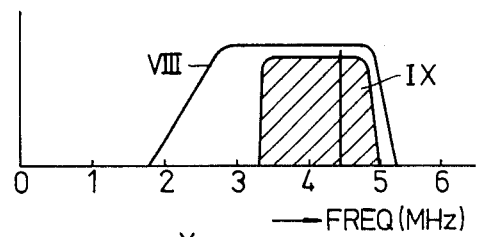
Figure 8C:
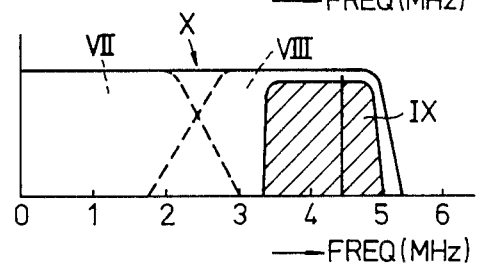

Accordingly, the mixing circuit 73 produces a reproduced color video signal which is in conformance with the PAL system and has a frequency spectrum X shown in FIG. 8C. In this reproduced color video signal, the band of the luminance signal is an added band of the bands VII and VIII of the luminance signals described before. Thus, as shown in FIG. 8C, the upper limit frequency becomes approximately equal to 5.5 MHz, and essentially the entire band of the PAL system luminance signal is transmitted with fidelity. The color video signal which is reproduced with a band which is extremely wide compared to the reproducing band of the existing VTR, is supplied to a time base corrector 83 which eliminates the time base deviating introduced during the recording and reproducing processes. An output signal of the time base corrector 83 is supplied to an output terminal 84, and a reproduced PAL system color video signal is produced from the output terminal 84. A device using CCDs, a circuit device which stabilizes the carrier chrominance signal according to the double heterodyne method, a feed-forward control type time base corrector, or other known circuit devices may be used for the time base corrector 83.

Figure 11:
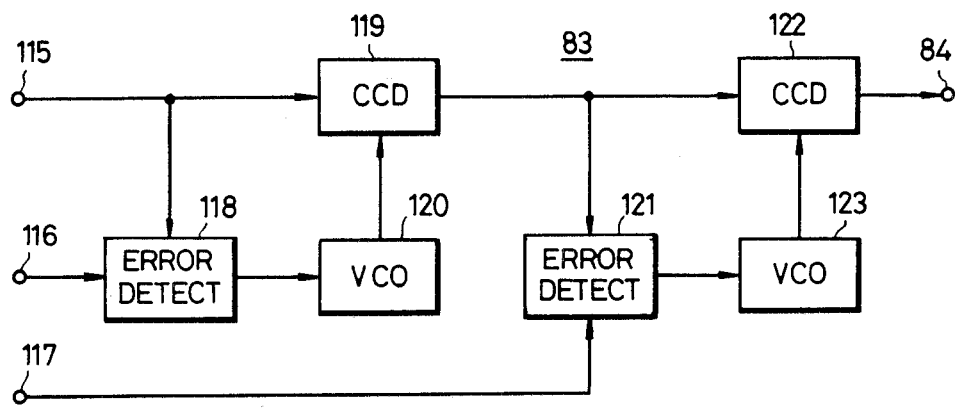
FIG. 11 is a systematic block diagram showing an example of a time base corrector.

FIG. 11 is a systematic block diagram showing an example of a general time base corrector employing CCDs. In FIG. 11, the reproduced color video signal from the mixing circuit 73, is applied to an input terminal 115. This reproduced color video signal from the input terminal 115, is supplied to a first error detecting circuit 118 and to a CCD (or BBD) 119. A chrominance subcarrier and a horizontal synchronizing signal having no time base deviation, are produced from an oscillator (not shown). The produced horizontal synchronizing signal is supplied to the first error detecting circuit 118 as a reference horizontal synchronizing signal, through an input terminal 116. On the other hand, the produced chrominance subcarrier is supplied to a second error detecting circuit 121 through an input terminal 117.

The first error detecting circuit 118 detects a phase error between the horizontal synchronizing signal within the reproduced color video signal from the terminal 115 and the reference horizontal synchronizing signal from the terminal 116. An output error voltage of the first error detecting circuit 118 is supplied to a voltage controlled oscillator (VCO) 120 so as to variable control the oscillation frequency of the VCO 120. As is well known, a CCD (or BBD) is a charge transfer element which is variably controlled of its delay time responsive to the clock pulse signal frequency.

Accordingly, the delay time of the CCD 119 is variably controlled by an output clock pulse signal of the VCO 120, in accordance with the phase error detected in the first error detecting circuit 118, so that the phase error between the horizontal synchronizing signal and the reference horizontal synchronizing signal becomes a minimum. Consequently, a reproduced color video signal in which the time base deviation in the horizontal synchronizing signal, that is, the time base deviation in the luminance signal, is corrected, is obtained from the CCD 119. This output reproduced color video signal of the CCD 119 is supplied to the second error detecting circuit 121 and to a CCD 122.

The second error correcting circuit 121 detects a phase error between a color burst signal within the reproduced signal from the CCD 119 and the reference subcarrier from the terminal 117. An error voltage having a level which is dependent on the phase error, is produced from the second error detecting circuit 121 and is supplied to a VCO 123 as a control voltage. An output pulse signal of the VCO 123 is applied to the CCD 122 as a clock pulse signal. Thus, as in the case of the CCD 117 described before, the delay time of the CCD 122 is variably controlled responsive to the output clock pulse signal of the VCO 123, in accordance with the time base deviation in the color burst signal within the reproduced color video signal, so that the time base deviation in the color burst signal becomes a minimum. Therefore, the CCD 122 produces a reproduced color video signal in which the time base deviations in both the luminance signal and the carrier chrominance signal are corrected, and this reproduced color video signal is obtained through the output terminal 84.

On the other hand, the bandpass filter 85 described before, separates a reproduced FM audio signal having the frequency spectrum IV shown in FIG. 5B. The bandpass filter 86 separates a reproduced FM audio signal having the frequency spectrum V shown in FIG. 5B. The output reproduced FM audio signals of the bandpass filters 85 and 86, are frequency-demodulated in respective frequency demodulators 87 and 88. Output signals of the frequency demodulators 87 and 88 are passed through respective sample and hold circuits 89 and 90 which sample and hold the respective input signals in order to reduce the noise which is generated when the rotary heads are switched. Output signals of the sample and hold circuits 89 and 90 are supplied to respective level expanding circuits 91 and 92 which perform noise reduction processes by carrying out level expansions complementary to the level compressions carried out in the respective level compressing circuits 50 and 51. A reproduced L-channel audio signal from the level expanding circuit 91 is produced through an output terminal 93, and a reproduced R-channel audio signal from the level expanding circuit 92 is produced through an output terminal 94.

According to this first embodiment of the signal reproducing system, the audio signals are recorded and reproduced by the rotary heads $H_{B1}$ and $H_{B2}$. Thus, the relative linear speed between the tape and the rotary head is extremely large compared to that in the existing VTR which records the audio signals by stationary heads. For this reason, according to this first embodiment, it is possible to record and reproduce audio signals of an extremely high quality.

Figure 9:
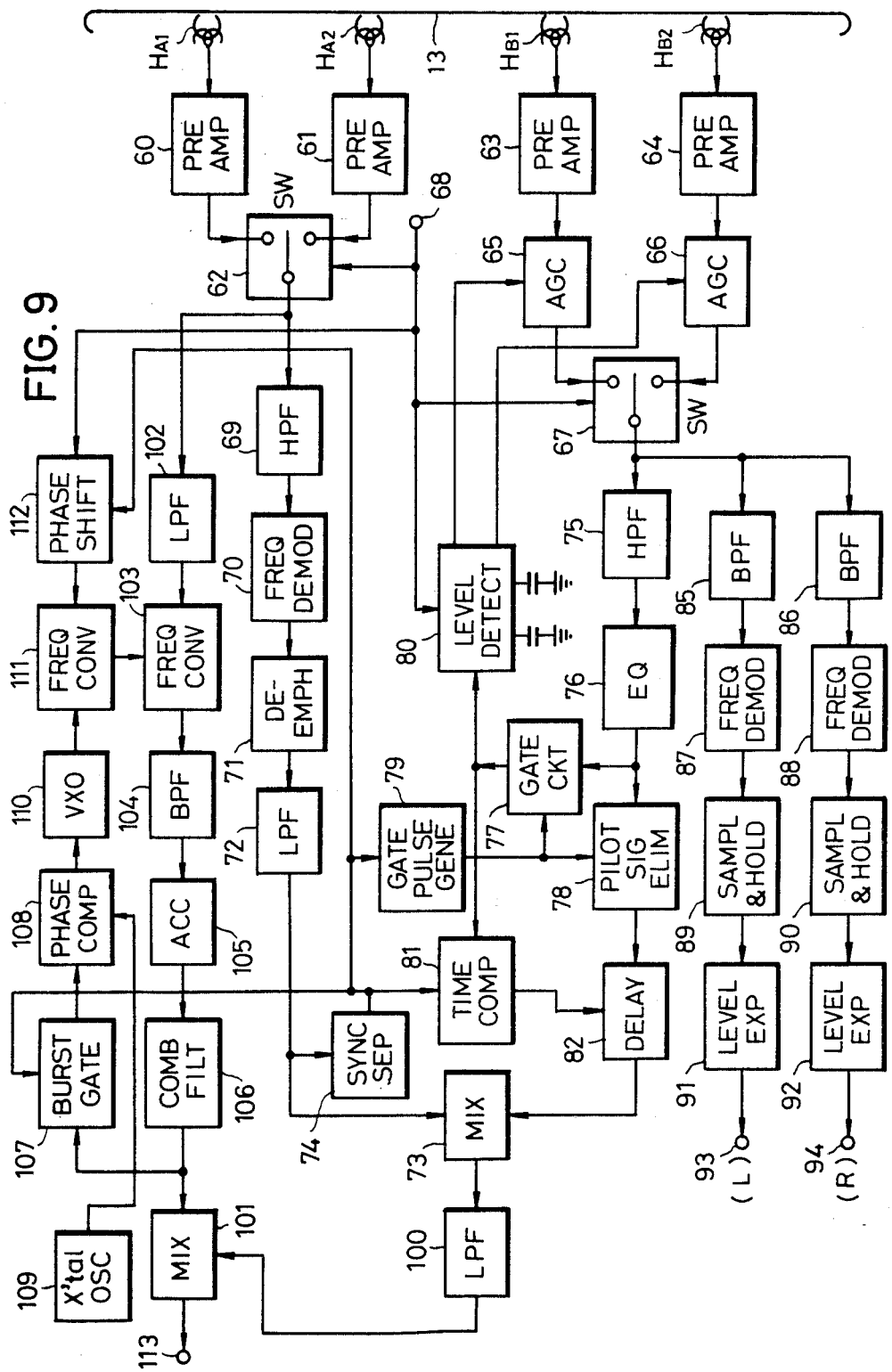
FIG. 9 is a systematic block diagram showing a second embodiment of a reproducing system of the apparatus according to the present invention.

Next, description will be given with respect to a second embodiment of a signal reproducing system of the apparatus according to the present invention, by referring to FIG. 9. In FIG. 9, those parts which are the same as those corresponding parts in FIG. 7 are designated by the same reference numerals, and their description will be omitted. This second embodiment is characterized in that the frequency converted carrier chrominance signal within the frequency division multiplexed signal is frequency-converted back into the original frequency band and is used as the reproduced carrier chrominance signal at the final output.

Figure 10A:
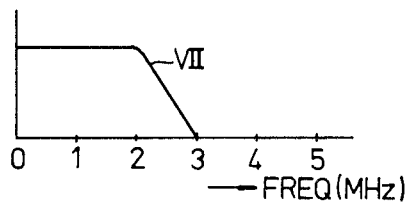
FIGS. 10A through 10F show signal waveforms at each part of the block system shown in FIG. 9.
Figure 10B:
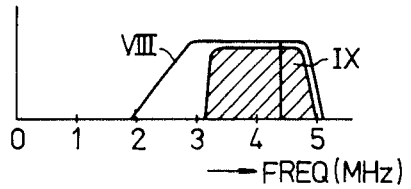
Figure 10C:
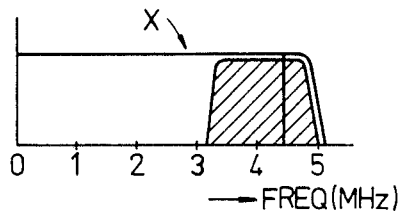
Figure 10D:
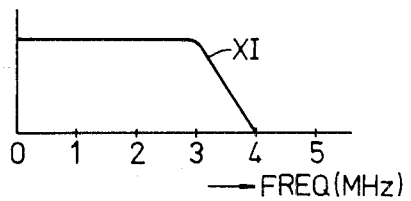

In FIG. 9, a reproduced luminance signal having a frequency spectrum VII shown in FIG. 10A (the frequency spectrum VII shown in FIG. 10A is the same as the frequency spectrum VII shown in FIG. 8A) is obtained from the lowpass filter 72. On the other hand, a reproduced high-frequency component having the frequency spectrum shown in FIG. 10B which is the same as the frequency spectrum shown in FIG. 8B, is obtained from the delay circuit 82. As a result, a reproduced color video signal having the frequency spectrum X shown in FIGS. 10C and 8C, is obtained from the mixing circuit 73, as in the case of the first embodiment described previously. However, in this second embodiment, the output reproduced color video signal of the mixing circuit 73 is supplied to a lowpass filter 100 having a cutoff frequency of approximately 4 MHz. The luminance signal is separated in the lowpass filter 100, and a reproduced luminance signal having a frequency spectrum XI shown in FIG. 10D is obtained from the lowpass filter 100. This output reproduced luminance signal of the lowpass filter 100 is supplied to a mixing circuit 101.

On the other hand, the reproduced frequency division multiplexed signal having the frequency spectrum shown in FIG. 5A is obtained from the switching circuit 62, and is supplied to a lowpass filter 102 having a cutoff frequency of approximately 1.2 MHz. The lowpass filter 102 separates the frequency converted carrier chrominance signal from the frequency division multiplexed signal, and supplies the frequency converted carrier chrominance signal to a frequency converter 103. The reproduced frequency converted carrier chrominance signal supplied to the frequency converter 103, includes a time base deviation which is introduced during the recording and reproducing processes. The chrominance subcarrier frequency $f_C$ of the reproduced frequency converted carrier chrominance signal can be described by $40f_{Ha}+(\frac{1}{8})f_{Ha}\pm f$, where $f_{Ha}$ is equal to $f_H \pm f_H$ and corresponds to a frequency shift caused by a slight difference between the tape moving speed at the time of the recording and the tape moving speed at the time of the reproduction. Further, $\Delta f$ represents a phase shift generated instantaneously when the rotation of the rotary heads is unstable and when the tape stretches or shrinks.

The frequency shift of $40f_{Ha}$ is corrected in an automatic frequency control (AFC) loop. In this AFC loop, a phase shifting circuit 112 which is supplied with the reproduced horizontal synchronizing signal from the synchronizing signal separating circuit 74 and the rotation detection pulse signal from the input terminal 68, supplies to a frequency converter 111 a signal having the frequency of $40f_{Ha}$. An output reproduced carrier chrominance signal of a comb filter 106, which is returned to the original band, is supplied to a burst gate circuit 107 wherein the color burst signal is separated. The color burst signal is supplied to a phase comparator 108. The comparator 108 performs a phase comparison between the output color burst signal of the burst gate circuit 107 and an output signal of a crystal oscillator 109. This output signal of the crystal oscillator 109 has a frequency equal to the chrominance subcarrier frequency $f_S$ of the PAL system. An output error voltage of the phase comparator 108 is applied to a voltage controlled type crystal oscillator (VXO) 110 as a control voltage, so as to control the output oscillation frequency of the VXO 110 to a frequency of $f_S+(\frac{1}{8})f_{Ha}\pm\Delta f$. The output signal of the VXO 110 is supplied to the frequency converter 111. An automatic phase control (APC) loop constituted by the above circuits, corrects the phase shift of $(\frac{1}{8})f_{Ha}\pm\Delta f$.

The frequency converter 111 produces a signal having a frequency of $f_S+40f_{Ha}+(\frac{1}{8})f_{Ha}\pm\Delta f$, and supplies this signal to the frequency converter 103. As described before, the frequency converter 103 is also supplied with the reproduced frequency converted carrier chrominance signal having the chrominance subcarrier frequency of $40f_{Ha}+(\frac{1}{8})f_{Ha}\pm\Delta f$. Thus, an output reproduced carrier chrominance signal of the frequency converter 103 obtained through a bandpass filter 104, is eliminated of the phase shift and frequency shift and has the chrominance subcarrier frequency $f_S$. The reproduced carrier chrominance signal from the bandpass filter 104 is passed through the ACC circuit 105 and is supplied to the comb filter 106 which includes a 2H delay circuit. The comb filter 106 eliminates the crosstalk components of the frequency converted carrier chrominance signals which are reproduced from the adjacent tracks (these adjacent tracks are the tracks $t_{a1}$ and $t_{a3}$ when reproducing the track $t_{a2}$) which are reproduced by the rotary head $H_{A1}$ or $H_{A2}$.

The phase shifting circuit 112 performs a phase shifting process similar to that performed in the phase shifting circuit 34 described before. In other words, the phase shifting circuit 112 performs a first process in which the phase is shifted by 90° in a predetermined direction during a period of one field, and a second process in which the phase is not shifted in a subsequent period of one field, and repeats an operation in which the first and second processes are alternately performed so as to produces a signal having a repetition frequency of $40f_H$. However, the direction of the phase shift performed in the phase shifting circuit 112 is opposite to that at the time of the recording. Accordingly, the phase shift performed at the time of the recording is cancelled by the phase shift performed in the phase shifting circuit 112, and the phase shifting circuit 112 produces a reproduced carrier chrominance signal in which there is no phase shift. Further, as is disclosed in the Japanese Patent Publication which was referred to before, it becomes possible to eliminate the crosstalk in the comb filter 106.

Figure 10E:
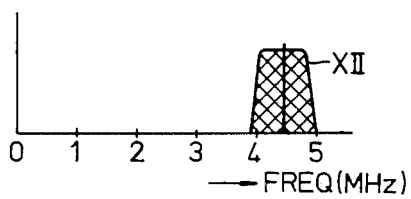

Hence, the time base deviation and the phase shift are eliminate in the comb filter 106, and the comb filter 106 produces a reproduced carrier chrominance signal which is returned to the original band and has a frequency spectrum XII shown in FIG. 10E. The output reproduced carrier chrominance signal of the comb filter 106 is supplied to the burst gate circuit 107 and to the mixing circuit 101. The mixing circuit 101 multiplexes the output reproduced carrier chrominance signal of the comb filter 106 and the output reproduced luminance signal of the lowpass filter 100.

Figure 10F:
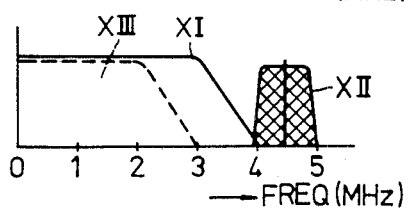

Therefore, the mixing circuit 101 produces a multiplexed signal made up of the output reproduced luminance signal of the lowpass filter 100 having the frequency spectrum XI shown in FIG. 10F and the output reproduced carrier chrominance signal of the comb filter 106 having the frequency spectrum XII shown in FIG. 10F. The output multiplexed signal of the mixing circuit 101 is produced through an output terminal 113 as a reproduced color video signal. In this reproduced color video signal, the luminance signal has the frequency spectrum XI which is wider than a frequency spectrum XIII of the reproduced luminance signal obtainable in the existing VTR by approximately 1 MHz, as may be seen from FIG. 10F. Further, the resolution becomes in the range of 320 lines which is considerably improved over the conventional resolution which is in the range of 250 lines.

The present invention is not limited to the embodiments described heretofore, and for example, the present invention may be applied to the recording and/or reproduction of an NTSC system color video signal or a SECAM system color video signal. When the present invention is applied to the recording and/or reproduction of the NTSC system color video signal, the resolution will not be improved considerably, however, the picture quality will be improved because the signal level within the band in the range of 2 MHz to 3 MHz will not become deteriorated. On the other hand, when the present invention is applied to the recording and/or reproduction of the SECAM system color video signal, it is unnecessary to provide a time base corrector, an APC loop, and an AFC loop, for eliminating the time base deviation in the reproduced frequency converted carrier chrominance signal and the reproduced carrier chrominance signal. In other words, the carrier chrominance signals of the PAL and NTSC system color video signals are balanced modulated waves, and the time base deviation in the reproduced carrier chrominance signal must be eliminated because the time base deviation will cause a change in the color phase or absence of color if not eliminated. But on the other hand, the carrier chrominance signal of the SECAM system color video signal is a frequency modulated wave, and the time base deviation in the reproduced carrier chrominance signal will not cause any problems.

The pilot signal which is used both as a time reference signal and a level reference signal, need not be recorded, and the color burst signal may be used instead of the pilot signal. On the other hand, the pilot signal need not be a burst wave, and the pilot signal may be a sinusoidal wave or a modulated wave. Furthermore, in the embodiments described heretofore, the distance between the gaps of the rotary heads $H_{A1}$ and $H_{B1}$ and the distance between the gaps of the rotary heads $H_{A2}$ and $H_{B2}$ are respectively selected to the recording length of 1H on the tape. However, the distance between the gaps is not limited to the recording length of 1H, and other arrangements may be employed as long as the rotary heads $H_{A1}$ and $H_{B1}$ (and the rotary heads $H_{A2}$ and $H_{B2}$) are close together. In addition, it was described that the tracks which are recorded directly with the high-frequency component of the color video signal, are also recorded with the FM audio signals of two channels. However, it is possible to record a frequency modulated audio signal of one channel or frequency modulated audio signals of three or more channels. In a case where the audio signals are recorded by use of a stationary head as is done in the existing VTR, it is possible to record signals such as an address signal indicative of the order of video programs and a time code signal indicative of the recording and reproducing times of the programs, in place of the frequency modulated audio signals. The audio signals need not be frequency-modulated, and may be modulated according to other modulation systems such as a pulse code modulation (PCM).

The track pattern on the tape is not limited to the track pattern shown in FIG. 6C. For example, a guard band may be formed between two adjacent tracks on the tape.

Further, the present invention may be applied to a VTR employing the known phase invert (PI) system.

The widths of the rotary heads $H_{A1}$, $H_{A2}$, $H_{B1}$, and $H_{B2}$ are greater than the widths of the tracks which are finally formed on the tape by these rotary heads. For this reason, the reproduced signal level will not decrease even when a slight tracking error takes place during the reproduction. Moreover, it is possible to minimize the decrease in the reproduced signal level when a tape recorded by the existing helical scan type VTR is played compatibly on the reproducing apparatus according to the present invention.

There is an existing VTR of a type which records frequency modulated audio signals on audio signal recording tracks by use of rotary heads exclusively for audio signals and having gaps with respective azimuth angles of ±30°, and records the video signals over the audio signal recording tracks by use of rotary video heads having gaps with respective azimuth angles of ±6°. When a tape recorded by this type of VTR is played compatibly on the reproducing apparatus according to the present invention, it is possible to reproduce the audio signal recording tracks with a minimum deterioration in the S/N ratio, because the widths of the rotary heads $H_{B1}$ and $H_{B2}$ are greater than the widths of the tracks which are formed on the tape by these rotary heads. This will be described in more detail, by referring to FIG. 12.

Figure 12:
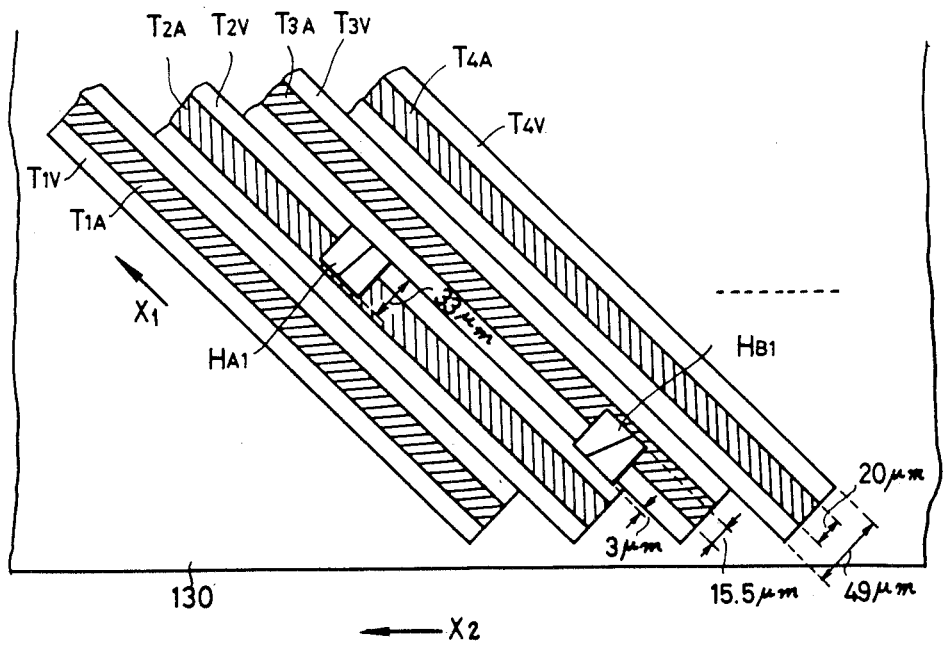
FIG. 12 is a diagram for explaining an example of the relationship between a track pattern on a magnetic tape which is recorded by an existing recording and reproducing apparatus and scanning positions of the rotary heads of the apparatus according to the present invention.

FIG. 12 shows an example of the relationships between the rotary heads and the tracks on a tape 130, when the tape 130 which is played on the reproducing apparatus according to the present invention is recorded by a so-called high-fidelity system VTR and has the tape pattern shown. Video signal recording tracks $T_{1V}, T_{3V}, \ldots$ which have a track width of 49 μm and are recorded with the frequency division multiplexed signal having the frequency spectrum shown in FIG. 5A by use of a first rotary head having a gap with an azimuth angle of $-6°$, and video signal recording tracks $T_{2V}$, $T_{4V}, \ldots$ which have a track and are recorded with the above frequency division multiplexed signal by use of a second rotary head having a gap with an azimuth angle of $+6°$, are alternately formed on the tape 130 with a track pitch of 49 μm. Further, audio signal recording tracks $T_{1A}, T_{3A}, \ldots$ which have a track width of 20 μm and are recorded with the FM audio signals having the frequency spectrums IV and V shown in FIG. 5B by use of a third rotary head having a gap with $T_{4A}, \ldots$ which have a track with of 20 μm and are recorded with the above FM audio signals by use of a fourth rotary head having a gap with an azimuth angle of $-30°$, are alternately formed on the tape 130 with a track pitch of 49 μm.

Unlike in the apparatus according to the present invention, the high-fidelity system VTR records the FM audio signals at the saturation level. In addition, since the recording wavelength of the frequency modulated audio signals is long in the high-fidelity system VTR, the frequency modulated audio signals are recorded in the deep part of the magnetic layer on the tape 130. On the other hard, the recording wavelength of the video signal (frequency division multiplexed signal) is short, and the frequency converted carrier chrominance signal is recorded at the unsaturated level. Thus, the frequency converted carrier chrominance signal is recorded in the surface part of the magnetic layer on the tape 130. After the audio signal recording tracks $T_{1A}$, $T_{3A}, \ldots$ are successively formed by the third rotary head, the first rotary head forms the video signal recording tracks $T_{1V}, T_{3V}, \ldots$ over the audio signal recording tracks $T_{1A}, T_{3A}, \ldots$ Similarly, after the audio signal recording tracks $T_{2A}, T_{4A}, \ldots$ are successively formed by the fourth rotary head, the second rotary head forms the video signal recording tracks $T_{2V}, T_{4V}$, $\ldots$ over the audio signal recording tracks $T_{2A}, T_{4A}, \ldots$ Accordingly, the video and audio signals are recorded without being erased. The audio signal recording tracks and the video signal recording tracks are formed so that the center lines of the audio signal recording tracks $T_{1A}, T_{2A}, T_{3A}, T_{4A}, \ldots$ coincide with the respective center lines of the video signal recording tracks $T_{1V}, T_{2V}, T_{3V}, T_{4V}, \ldots$ When the tape 130 having the above described track pattern is played on the reproducing apparatus according to the present invention, the rotary heads $H_{A1}$ and $H_{B1}$ scan over the tracks at positions shown in FIG. 12. In other words, the rotary head $H_{A1}$ scans over a track part having a width of 33 μm of the video signal recording track $T_{2V}$ which is recorded by the rotary head having the gap with the azimuth angle of $+6°$. In addition, since the rotary head $H_{B1}$ assumes a height position which is higher than the that of the rotary head $H_{A1}$ by 30 μm as shown in FIG. 2, the rotary head $H_{B1}$ scans over a track part having a width of 15.5 μm of the audio signal recording track $T_{3A}$ which is recorded by the rotary head having the gap with the azimuth angle of $+30°$, so as to reproduce the recorded frequency modulated audio signals. In the apparatus according to the present invention, the rotary heads $H_{A1}, H_{A2}, H_{B1}$, and $H_{B2}$ are arranged so that the track on which the video signal is recorded and from which the video signal is reproduced, is shifted from the track on which the audio signals are recorded and from which the audio signals are reproduced. For this reason, the video and audio signals can be reproduced satisfactorily from the tape 130, when the tape 130 is played compatibly on the apparatus according to the present invention.

In the above case, the utilization rate of the video signal recording tracks is equal to 33/49 ($\div -3.4$ dB), and the utilization rate of the audio signal recording tracks is equal to 15.5/20 ($\div -2.5$ dB). Hence, compared to the case where the utilization rate of the tracks is equal to 100% and the heads scan over the full widths of the tracks, the output reproduced video signal level decreases by approximately $-3.4$ dB, and the output reproduced audio signal level decreases by approximately $-2.5$ dB. However, because the noise introduced in this case is random noise, the decrease in the output reproduced signal level can actually be considered as being $\frac{1}{2}$ the actual decrease. For this reason, the deterioration in the S/N ratio becomes $\frac{1}{2}$ the actual decrease in the output reproduced signal level. The decrease in the S/N ratio to this extent, can be compensated for by improving the performance of the heads and modifying the circuits, and do not introduce problems.

In the case described above, the video signal recording track and the audio signal recording track are reproduced with a shift of one track, and a time difference is introduced between the signals reproduced from the video signal recording track and the audio signal recording track. However, the rotary head which forms the audio signal recording track $T_{2A}$, for example, is mounted at a position leading the rotary head which forms the video signal recording track $T_{2V}$ by a predetermined angle in the rotating direction of the heads. This means that the audio signals recorded on the audio signal recording track $T_{A2}$ are advanced in time with respect to the video signal recorded on the video signal recording track $T_{V2}$, by a time (for example, a time corresponding to approximately $\frac{1}{2}$ fields) corresponding to the angular difference in the mounting positions of the two rotary heads. Therefore, when the tape 130 shown in FIG. 12 is played on the apparatus according to the present invention and the rotary head $H_{B1}$ (or $H_{B2}$) scans over the audio signal recording track $T_{3A}$ which is one track after the video signal recording track $T_{2V}$ which is scanned by the rotary head $H_{A1}$ (or $H_{A2}$), the audio signals reproduced from the audio signal recording track $T_{3A}$ are delayed in time with respect to the video signal reproduced from the video signal recording track $T_{2V}$ by a time corresponding to approximately $\frac{1}{2}$ fields. However, the human eyes and ears are not capable of sensing such a time difference between the reproduced video and audio signals from the reproduced picture and sound, and no problems will be introduced by such a time difference between the reproduced video and audio signals.

When a tape recorded by the existing VTR of the type which records the audio signals by use of a stationary head is played compatibly on the apparatus according to the present invention, the reproduced output is only obtained from the rotary heads $H_{A1}$ and $H_{A2}$. During such a compatible reproduction, the video signal will not be reproduced with a wider band, but it is possible to reproduce the video signal with the transmission band of this existing VTR.

On the other hand, when the tape 13 recorded by the apparatus according to the present invention and having the track pattern shown in FIG. 6C is played compatibly on the existing VTR, the video signal is reproduced from the tracks having the width of 30 μm, regardless of whether the existing VTR is provided with rotary heads for the audio signal. In a case where the existing VTR is provided with the rotary heads for audio signals, it is possible to reproduce the FM audio signals from the tracks having the width of 19 μm during such a compatible reproduction. During such a compatible reproduction, the video signal will not be reproduced with a wider band, however, it is possible to reproduce the video signal with the transmission band of this existing VTR.

Further, the present invention is not limited to these embodiments, but various variations and modifications may be made without departing from the scope of the present invention.

What is claimed is:

1. A method of recording and/or reproducing color video signal, said method comprising the steps of:
   (a) separating a luminance signal and a carrier chrominance signal from a color video signal;
   (b) frequency-modulating the separated luminance signal so as to obtain a frequency modulated luminance signal;
   (c) frequency-converting the separated carrier chrominance signal into a band which is lower than a band of the frequency modulated luminance signal so as to obtain a frequency converted carrier chrominance signal;
   (d) frequency-division-multiplexing the frequency modulated luminance signal and the frequency converted carrier chrominance signal so as to obtain a frequency division multiplexed signal;
   (e) recording the frequency division multiplexed signal on a first track on a magnetic tape by use of a first head;
   (f) obtaining an added signal by adding a high-frequency component of the color video signal and a high-frequency bias signal;
   (g) recording a high-frequency signal at least including the added signal on a second track on the magnetic tape by use of a second head, said second track being formed simultaneously as the first track, at a position on the magnetic tape which is different from a position of the first track;
   (h) successively recording the color video signal in terms of pairs of tracks constituted by the first and second tracks;
   (i) successively reproducing the color video signal in terms of the pairs of tracks;
   (j) obtaining at least a reproduced luminance signal from a reproduced frequency division multiplexed signal which is reproduced from the first track;
   (k) obtaining at least a reproduced high-frequency component of a luminance signal from a reproduced high-frequency signal which is reproduced from the second track; and
   (l) multiplexing the reproduced luminance signal, the reproduced high-frequency component of the luminance signal, and a reproduced carrier chrominance signal which is obtained by converting a reproduced frequency converted carrier chrominance signal within the reproduced frequency division multiplexed signal, or a carrier chrominance signal within the reproduced high-frequency signal, so as to obtain a reproduced color video signal.

2. A method as claimed in claim 1 wherein a first pair of tracks constituted by the first and second tracks is formed by the first and second heads having gaps of mutually different azimuth angles, and a second pair of tracks subsequent to the first pair of tracks is formed by third and fourth heads having gaps of azimuth angles which mutually differ and are different from the azimuth angles of the gaps of the first and second heads.

3. A method as claimed in claim 1 wherein the first track has a width which is greater than a width of the second track.

4. A method as claimed in claim 1 wherein said high-frequency signal is a multiplexed signal made up of a time reference signal and said added signal, said time reference signal being a reference for compensating a relative time difference between the signals which are reproduced from the first and second tracks.

5. A method as claimed in claim 4 wherein said time reference signal is a burst signal which is time-division-multiplexed with the high-frequency component of the color video signal, with a predetermined period.

6. A method as claimed in claim 1 wherein said high-frequency signal is a multiplexed signal made up of modulated signals and said added signal, said modulated signals being obtained by modulating audio signals of one or a plurality of channels.

7. A method as claimed in claim 1 wherein said frequency division multiplexed signal has a frequency spectrum identical to a frequency spectrum of a frequency division multiplexed signal which is recorded in an existing helical scan type VTR, and said pairs of tracks are formed with a track pitch identical to a track pitch of tracks which are formed in the existing helical scan type VTR.

8. A method as claimed in claim 7 wherein a first pair of tracks constituted by the first and second tracks is formed by the first and second heads having gaps of mutually different azimuth angles, a second pair of tracks subsequent to the first pair of tracks is formed by third and fourth heads having gaps of azimuth angles which mutually differ and are different from the azimuth angles of the gaps of the first and second heads, said existing helical scan type VTR is of a type which alternately records frequency modulated audio signals on audio tracks by use of a third pair of heads and alternately records the frequency division multiplexed signal over the audio tracks on tracks by use of a fourth pair of heads, the azimuth angle of the gap of said first head which forms the first track is the same as an azimuth angle of a gap of one of said fourth pair of heads, the azimuth angle of the gap of said second head which forms the second track is the same as an azimuth angle of a gap of one of said third pair of heads which forms the audio track adjacent to the track formed by said one of the fourth pair of heads, and said first head leads the second head by an extremely short distance in a rotation direction of the heads and is mounted at a position which is lower than a position of the second head by a distance which is shorter than one track pitch.

9. A method as claimed in claim 1 wherein said high-frequency bias signal has a frequency which is four times a chrominance subcarrier frequency $f_S$ of the carrier chrominance signal.

10. A color video signal recording and reproducing apparatus comprising:

first circuit means for frequency-modulating a luminance signal which is separated from a color video signal so as to produce a frequency modulated luminance signal;

second circuit means for frequency-converting a carrier chrominance signal which is separated from the color video signal into a band which is lower than a band of the frequency modulated luminance signal so as to produce a frequency converted carrier chrominance signal;

frequency division multiplexing means for frequency-division-multiplexing the output frequency modulated luminance signal of said first circuit means and the output frequency converted carrier chrominance signal of said second circuit means so as to obtain a frequency division multiplexed signal;

first recording and reproducing means for recording the output frequency division multiplexed signal of said frequency division multiplexing means on a first track on a magnetic tape by supplying the frequency division multiplexed signal to one of a first pair of heads among a plurality of pairs of heads during a recording mode, said heads constituting a pair being arranged close to each other, and for reproducing the frequency division multiplexed signal from the first track during a reproducing mode;

separating means for separating a high-frequency component of the color video signal from the color video signal;

high-frequency signal generating means for generating a high-frequency signal including at least an added signal which is made up of the high-frequency component and a high-frequency bias signal;

second recording and reproducing means for recording the output high-frequency signal of said high-frequency signal generating means on a second track by supplying the high-frequency signal to the other of said first pair of heads during the recording mode, said second track being formed simultaneously with the formation of said first track and being formed at a position on the magnetic tape that is different from a position of said first track, and for reproducing the high-frequency signal from the second track during the reproducing mode;

separating and demodulating means for separating a reproduced frequency modulated luminance signal from the frequency division multiplexed signal which is reproduced from the first track by said first recording and reproducing means, and for demodulating the reproduced frequency modulated luminance signal so as to produce a reproduced luminance signal;

high-frequency component obtaining means for obtaining a reproduced high-frequency component from the high-frequency signal which is reproduced from the second track by said second recording and reproducing means so as to produce a reproduced high-frequency component;

delay means for matching the timing of the output reproduced high-frequency component of said high-frequency component obtaining means and a synchronizing signal within the output reproduced luminance signal of said separating and demodulating means, by use of a time reference signal within the high-frequency signal which is reproduced from the second track and the synchronizing signal within the output reproduced luminance signal of said separating and demodulating means; and mixing means for mixing an output reproduced high-frequency component of said delay means and the output reproduced luminance signal of said separating and demodulating means, so as to produce a reproduced color video signal.

11. A recording and reproducing apparatus as claimed in claim 10 in which said frequency division multiplexed signal has a frequency spectrum identical to a frequency spectrum of a frequency division multiplexed signal which is recorded in an existing helical scan type VTR, and the pairs of tracks constituted by said first and second tracks are formed with a track pitch identical to a track pitch of tracks which are formed in the existing helical scan type VTR.

12. A color video signal recording and reproducing apparatus comprising:

first circuit means for frequency-modulating a luminance signal which is separated from a PAL or SECAM system color video signal so as to produce a frequency modulated luminance signal;

second circuit means for frequency-converting a carrier chrominance signal which is separated from the color video signal into a band which is lower than a band of the frequency modulated luminance signal so as to produce a frequency converted carrier chrominance signal;

frequency division multiplexing means for frequency-division-multiplexing the output frequency modulated luminance signal of said first circuit means and the output frequency converted carrier chrominance signal of said second circuit means so as to obtain a frequency division multiplexed signal;

first recording and reproducing means for recording the output frequency division multiplexed signal of said frequency division multiplexing means on a first track on a magnetic tape by supplying the frequency division multiplexed signal to one of a first pair of heads among a plurality of pairs of heads during a recording mode, said heads constituting a pair being arranged close to each other, and for reproducing the frequency division multiplexed signal from the first track during a reproducing mode;

separating means for separating a high-frequency component of the color video signal from the color video signal;

high-frequency signal generating means for generating a high-frequency signal including at least an added signal which is made up of the high-frequency component and a high-frequency bias signal;

second recording and reproducing means for recording the output high-frequency signal of said high-frequency signal generating means on a second track by supplying the high-frequency signal to the other of said first pair of heads during the recording mode, said second track being formed simultaneously with the formation of said first track and being formed at a position on the magnetic tape that is different from a position of said first track, and for reproducing the high-frequency signal from the second track during the reproducing mode;

separating and demodulating means for separating a reproduced frequency modulated luminance signal from the frequency division multiplexed signal which is reproduced from the first track by said first recording and reproducing means, and for demodulating the reproduced frequency modulated luminance signal so as to produce a reproduced luminance signal;

high-frequency component obtaining means for obtaining a reproduced high-frequency component from the high-frequency signal which is reproduced from the second track by said second recording and reproducing means so as to produce a reproduced high-frequency component;

delay means for matching the timing of the output reproduced high-frequency component of said high-frequency component obtaining means and a synchronizing signal within the output reproduced luminance signal of said separating and demodulating means, by use of a time reference signal within the high-frequency signal which is reproduced from the second track and the synchronizing signal within the output reproduced luminance signal of said separating and demodulating means;

first mixing means for mixing an output reproduced high-frequency component of said delay means and the output reproduced luminance signal of said separating and demodulating means, so as to produce a reproduced color video signal; and correcting means at least supplied with the output reproduced color video signal of said first mixing means or with a carrier chrominance signal which is reproduced from the first track, for carrying out a time base correction so as to produce a reproduced color video signal having a corrected time base.

13. A recording and reproducing apparatus as claimed in claim 12 in which said correcting means comprises a time base corrector which is only supplied with the output reproduced color video signal of said first mixing means, and said time base corrector eliminates a time base deviation in the output reproduced color video signal of said first mixing means so as to produce the reproduced color video signal having the corrected time base.

14. A recording and reproducing apparatus as claimed in claim 12 in which said correcting means comprises first means for obtaining a reproduced carrier chrominance signal by separating a reproduced frequency converted carrier chrominance signal from the time division multiplexed signal which is reproduced from the first track, converting the reproduced frequency converted carrier chrominance signal back into the original band to obtain a reproduced carrier chrominance signal, and eliminating a time base deviation in the reproduced carrier chrominance signal, filter circuit means for separating a reproduced luminance signal from the output reproduced color video signal of said first mixing means, and second mixing means for mixing the output reproduced carrier chrominance signal of said first means and the output reproduced luminance signal of said filter circuit means so as to produce the reproduced color video signal having the corrected time base.

15. A recording and reproducing apparatus as claimed in claim 12 in which a first pair of tracks constituted by the first and second tracks is formed by first and second heads which constitute said first pair of heads and have gaps of mutually different azimuth angles, and a second pair of tracks subsequent to the first pair of tracks is formed by third and fourth heads which constitute a second pair and have gaps of azimuth angles which mutually differ and are different from the azimuth angles of the gaps of the first and second heads.

16. A recording and reproducing apparatus as claimed in claim 12 in which the first track has a width which is greater than a width of the second track.

17. A recording and reproducing apparatus as claimed in claim 12 in which said high-frequency signal is a multiplexed signal made up of a time reference signal and said added signal, said time reference signal being a reference for correcting a relative time difference between the signals which are reproduced from the first and second tracks.

18. A recording and reproducing apparatus as claimed in claim 17 in which said time reference signal is a burst signal which is time-division-multiplexed with the high-frequency component of the color video signal, with a predetermined period.

19. A recording and reproducing apparatus as claimed in claim 12 in which said high-frequency signal generating means comprises first circuit means for generating modulated signals which are obtained by modulating audio signals of one or a plurality of channels, and second circuit means for mixing the output modulated signals of said first circuit means and said added signal.

20. A recording and reproducing apparatus as claimed in claim 12 in which said frequency division multiplexed signal has a frequency spectrum identical to a frequency spectrum of a frequency division multiplexed signal which is recorded in an existing helical scan type VTR, and said pairs of tracks are formed with a track pitch identical to a track pitch of tracks which are formed in the existing helical scan type VTR.

21. A recording and reproducing apparatus as claimed in claim 20 in which a first pair of tracks constituted by the first and second tracks is formed by first and second heads having gaps of mutually different azimuth angles, a second pair of tracks subsequent to the first pair of tracks is formed by third and fourth heads having gaps of azimuth angles which mutually differ and are different from the azimuth angles of the gaps of the first and second heads, said existing helical scan type VTR is of a type which alternately records frequency modulated audio signals on audio tracks by use of a third pair of heads and alternately records the frequency division multiplexed signal over the audio tracks on tracks by use of a fourth pair of heads, the azimuth angle of the gap of said first head which forms the first track is the same as an azimuth angle of a gap of one of said fourth pair of heads, the azimuth angle of the gap of said second head which forms the second track is the same as an azimuth angle of a gap of one of said third pair of heads which forms the audio track adjacent to the track formed by said one of the fourth pair of heads, and said first head leads the second head by an extremely short distance in a rotation direction of the heads and is mounted at a position which is lower than a position of the second head by a distance which is shorter than one track pitch.

22. A recording and reproducing apparatus as claimed in claim 12 in which said high-frequency bias signal has a frequency which is four times a chrominance subcarrier frequency $f_S$ of the carrier chrominance signal.

* * * * *